(12) United States Patent
Daton-Lovett

(10) Patent No.: US 9,541,447 B2
(45) Date of Patent: Jan. 10, 2017

(54) SENSOR ASSEMBLY AND A METHOD OF SENSING

(71) Applicant: RTL Materials Limited, Lymington Hampshire (GB)

(72) Inventor: Andrew James Daton-Lovett, Lymington (GB)

(73) Assignee: RTL MATERIALS LIMITED, Lymington (GB)

( * ) Notice: Subject to any disclaimer, the term of this patent is extended or adjusted under 35 U.S.C. 154(b) by 258 days.

(21) Appl. No.: 14/523,638

(22) Filed: Oct. 24, 2014

(65) Prior Publication Data

US 2015/0128705 A1 May 14, 2015

Related U.S. Application Data

(63) Continuation of application No. 13/375,424, filed as application No. PCT/GB2010/050897 on May 28, 2010, now Pat. No. 8,893,549.

(30) Foreign Application Priority Data

Jun. 3, 2009 (GB) .................................. 0909525.8

(51) Int. Cl.
*G01H 7/00* (2006.01)
*G01H 17/00* (2006.01)
(Continued)

(52) U.S. Cl.
CPC ........... *G01H 17/00* (2013.01); *E21B 47/0001* (2013.01); *E21B 47/01* (2013.01); *G01D 11/30* (2013.01); *G01K 1/00* (2013.01); *G01L 1/00* (2013.01); *G01L 7/00* (2013.01); *G02B 6/00* (2013.01)

(58) Field of Classification Search
CPC ...... E21B 47/0001; E21B 47/01; G01D 11/30; G02B 6/00; G01K 1/00; G01L 1/00; G01L 7/00; G01H 17/00
(Continued)

(56) References Cited

U.S. PATENT DOCUMENTS 5,140,155 A 8/1992 Carome
5,193,912 A 3/1993 Saunders
(Continued)

FOREIGN PATENT DOCUMENTS

EP 2884520 * 6/2015
WO 88/08620 11/1988
(Continued)

OTHER PUBLICATIONS

International Search Report mailed Sep. 21, 2010 in corresponding International Patent Application No. PCT/GB2010/050897.

*Primary Examiner* — J M Saint Surin
(74) *Attorney, Agent, or Firm* — Pillsbury Winthrop Shaw Pittman LLP

(57) ABSTRACT

There is disclosed a sensor assembly and a method of sensing. The sensor assembly is for sensing a property associated with a structure of interest. The sensor assembly includes an elongate member constructed and arranged so as to be capable of assuming a structure-engaging form in which it is resiliently biased such that the member can engage with and grip the structure along at least part of the length of the member, and, at least one sensor supported by the elongate member.

20 Claims, 6 Drawing Sheets

(51) Int. Cl.
*G01K 1/00* (2006.01)
*G01L 1/00* (2006.01)
*G02B 6/00* (2006.01)
*E21B 47/00* (2012.01)
*E21B 47/01* (2012.01)
*G01D 11/30* (2006.01)
*G01L 7/00* (2006.01)

(58) Field of Classification Search
USPC .......................... 73/570, 700, 760; 374/100
See application file for complete search history.

(56) References Cited

U.S. PATENT DOCUMENTS

| | | | |
|---|---|---|---|
| 5,440,193 A | 8/1995 | Barrett | |
| 6,834,552 B1* | 12/2004 | Thorsen | G01L 1/24 73/800 |
| 7,275,434 B2* | 10/2007 | Ullmann | B81B 7/0012 73/504.15 |
| 8,162,539 B2 | 4/2012 | Mau et al. | |
| 8,191,792 B2 | 6/2012 | Bandoh | |
| 2004/0168521 A1 | 9/2004 | Andersen | |
| 2005/0210961 A1 | 9/2005 | De Aquino | |
| 2014/0176344 A1* | 6/2014 | Littlestar | F16L 55/46 340/870.07 |

FOREIGN PATENT DOCUMENTS

| | | |
|---|---|---|
| WO | 97/35706 | 10/1997 |
| WO | 99/62811 | 12/1999 |
| WO | 99/62812 | 12/1999 |
| WO | 02/25057 | 3/2002 |
| WO | 2008/148776 | 12/2008 |

* cited by examiner

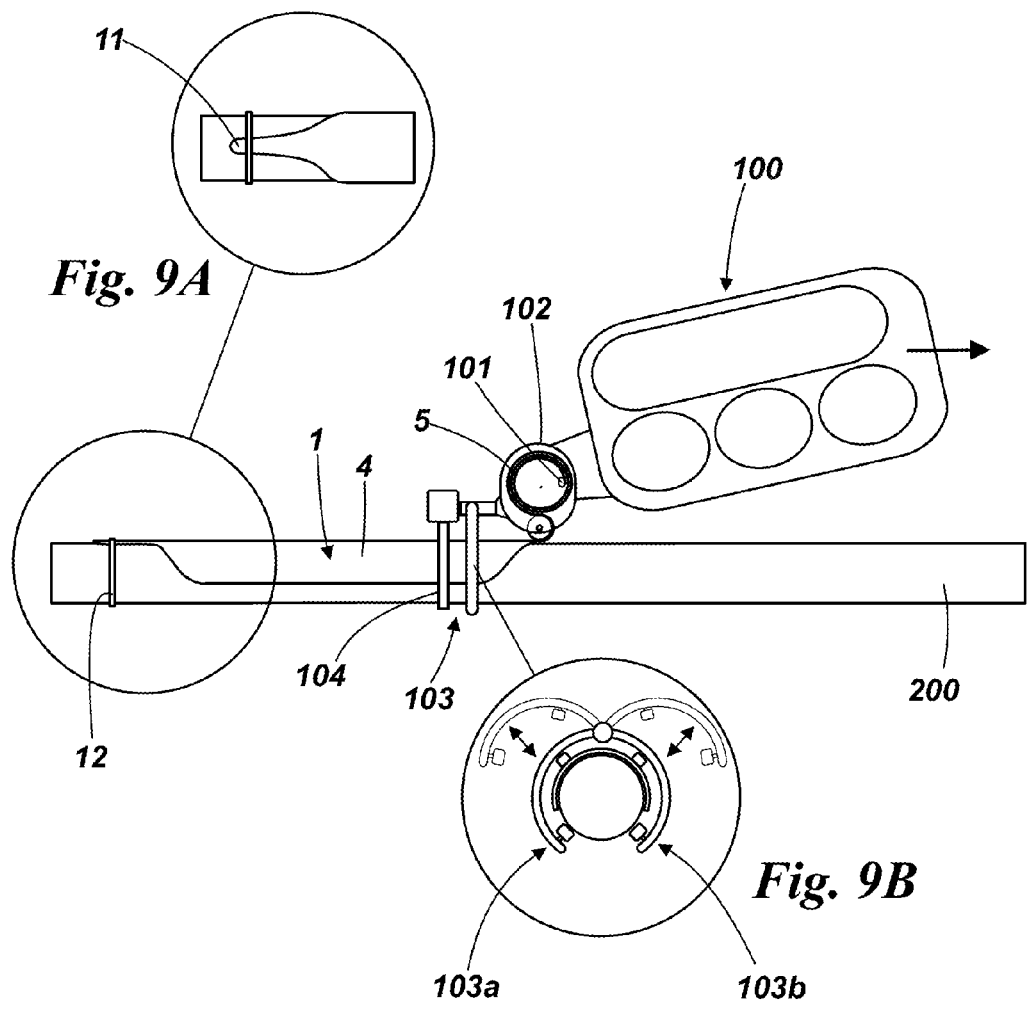

SENSOR ASSEMBLY AND A METHOD OF SENSING

This application is a continuation of co-pending U.S. patent application Ser. No. 13/375,424, filed Feb. 13, 2012, which is the National Phase entry of PCT/GB2010/050897, filed May 28, 2010, which claims priority to Great Britain Patent Application No. 0909525.8, filed Jun. 3, 2009. The content of these applications is incorporated herein by reference in their entirety.

The present invention relates to a sensor assembly and to a method of sensing.

There are many applications where it is desirable to measure same property associated with a structure, such as a beam or a pipe or a girder, etc. For example, it may be desired to measure the temperature of a structure, or the pressure experienced by a structure or the stress or strain experienced by a structure. This may be done to ascertain the operating conditions of the structure, or as a way of monitoring the structure for signs of damage or signs indicative of imminent failure of the structure, etc.

To this end, an operator may visit the structure to perform an inspection of the structure with measuring equipment. However, this is labour intensive and time consuming, and prohibitive in many situations. Alternatively, sensors can be applied to the structure in a variety of ways.

For example, in the field of petrochemical pipelines it is known to insert a Pipeline Inspection Gauge (PIG) into a pipe to sense properties of the pipe as the PIG advances through the pipe. This has the disadvantage that the sensors are only temporarily in any particular position in the pipe so that only a "snapshot" of the condition of the pipe can be obtained. Also, the type of sensing that can be performed by a PIG is constrained due to the fact that the PIG must move in the pipe. This can introduce acoustic noise and makes using certain types of sensor difficult or impossible where the sensors need to have a reliable contact with the structure, e.g. a strain gauge.

It is also known to attach suitable stationary sensors to a structure or to otherwise incorporate sensors in or on a structure to sense a property of interest so that a measurement can be obtained.

Discrete sensors can be attached to the structure, for example by bolting or gluing the sensor to the structure. These tend to have the disadvantage that they only measure localised properties of the structure, such as the temperature at a particular point where the sensor is located. To build a temperature profile along a length of the structure, it would normally be necessary to apply many sensors to the structure, which requires greater time and effort from an operator in fitting the sensors.

An example of a sensor that can be attached to a structure is a strain gauge, the use of which is well known per se to measure deformation in underlying structures. Typically, the strain gauge consists of an insulating flexible backing which supports a metallic foil pattern. The gauge is attached to the structure by a suitable adhesive, such as cyanoacrylate. As the structure is deformed, the foil is correspondingly deformed, causing its electrical resistance to change, which can be measured to give an indication of the deformation of the structure. Strain gauges however can be difficult to attach, for example where the structure to be measured is hard to access by an operator. Strain gauges usually need to be permanently attached, making it difficult or impossible to replace, move, or remove a sensor once in place. Strain gauges also usually measure relatively localised properties of the structure and in most cases are limited to measuring strain (i.e. deformation) of the structure.

Alternatively, sensors may be incorporated into the structure at the time of manufacture. This has the advantage that operator time is not required in fitting the sensors. However, it has the disadvantage that the manufacturing process is made more complicated and possibly the performance of the structure is degraded due to having to accommodate the sensors. Another disadvantage of this scheme is that sensors incorporated into the structure at the time of manufacture usually cannot be removed, meaning that it is generally impossible to repair or replace a malfunctioning sensor, or upgrade a sensor, or even move a sensor to a different part of the structure or to a different structure.

According to a first aspect of the present invention, there is provided a sensor assembly for sensing a property associated with a structure of interest, the assembly comprising:

an elongate member constructed and arranged so as to be capable of assuming a structure-engaging form in which it is resiliently biased such that the member can engage with and grip a said structure along at least part of the length of the member; and, at least one sensor supported by the elongate member.

The member is in effect capable of "clipping" to the structure, i.e. engaging with and gripping the structure due to its resiliency. This means that the sensor assembly can be fitted to the structure without the use of adhesives, bolts, etc. The clipping arrangement means that the member is simple to fit to a structure. The sensor assembly can be engaged to the outside of a structure, for example to the outside of a beam, or pipe, or girder, etc. Alternatively, the sensor assembly can be engaged to the "inside" of a structure where the structure is hollow or has a concave cavity, such as a hollow pipe.

As well as attaching the sensor assembly to the structure, the gripping arrangement allows the structure to conform closely to the structure, meaning that the sensing assembly experiences similar conditions as the structure. For example, stress, strain and vibration may be transmitted to the sensing assembly with a high degree of fidelity meaning that whatever property of the structure is being measured can be derived accurately from the data produced from the sensor of the sensor assembly. The clipping arrangement also means that the sensor assembly can minimise acoustic noise due to friction caused by movement of the sensing apparatus relative to the structure.

The member being elongate means that the structure can be sensed along a length of the structure due to the longitudinal extent of the member being substantially greater than the transverse extent of the member when in the structure-engaging form. This means that a single sensor assembly requiring a single fitting operation to the structure can be used to monitor a substantial length of the structure over period of time. The particular longitudinal extent of the member is determined by the desired application of the sensor assembly. Nonetheless, in preferred embodiments the longitudinal extent of the member may at least 5 times, or at least 10 times, or at least 50 times, or at least 100 times the transverse extent of the member when in the structure engaging form.

Thus the present invention provides a convenient way of monitoring a length of structure, where the sensor assembly can be retrofitted to the structure, or fitted to the structure at the time of installation of the structure, or even incorporated to the structure at the time of manufacture, as desired. The clipping arrangement also allows removal of the sensor assembly so that the sensor assembly can be repaired, upgraded, or moved in location, or retrieved for data recovery.

In principle, any suitable type of sensor can be used, such as for example fibre optic sensor systems that are known to be embedded in flexible pipes as described below. Other types of sensors, such as strain gauges or any other suitable sensor may be used. The sensor or sensors can extend the full length of the sensor assembly or at least a substantial portion thereof. The sensor or sensors can be run continuously longitudinally along the member or a portion of the member (such as a continuous length of fibre optic sensor). Alternatively, a plurality of sensors may be positioned at various longitudinal positions on the member. In any event, it is preferred that the sensor or sensors are arranged to be able to sense the structure at a plurality of longitudinal positions.

Preferably the member is formed from a sheet-like material having first and second longitudinal edges that is folded in on itself longitudinally to form a tube or a longitudinal section of a tube when the member is in the structure-engaging form. This provides a convenient form for the sensor assembly to be able to engage with and grip the structure.

This allows many convenient materials and manufacturing techniques to be used, for example, Fibre Reinforced Plastics or bistable materials, as discussed in more detail below. Using a sheet-like material allows the member to have thin walls. This arrangement also lends itself to embodiments where the sensor assembly is coiled or otherwise compacted for storage. This can help minimise any impact of the sensor on the function of the structure being monitored. For example, this allows the sensor assembly to have a low profile relative to the surface of the structure, so that the sensing assembly interferes as little as possible with the performance of the structure and influences as little as possible the properties of the structure that it is desired to measure. Preferably the sensors do not protrude significantly or at all from the surface of the member so that the low profile of the sensor assembly is maintained.

In a preferred embodiment, in transverse cross section the structure-engaging form of the member subtends an angle of at least 180 degrees. Having an angle of at least 180 degrees allows the member to clip securely to the structure. In another preferred embodiment, in transverse cross section the structure-engaging form of the member subtends an angle of about 360 degrees. In other words, the member forms an approximate tube. This can help provide an even more secure engagement between the sensor assembly and the structure as the member can grip all around the structure. In another preferred embodiment, in transverse cross section the structure-engaging form of the member subtends an angle of more than 360 degrees. In other words, there is some overlap between the longitudinal edges of the member in this embodiment. Again, this can help provide a more secure engagement to the structure.

In a preferred embodiment, in transverse cross section the structure-engaging form of the member is generally curved. This provides a sensing apparatus that is highly versatile in being engageable to a variety of different structures. Preferred embodiments may be circular or oval. However, as described in more detail below, other cross sectional forms are possible. For example, the cross section can have straight portions whilst being generally curved. In principle, the cross section can even be polygonal. The precise shape of cross section chosen for the member is in practice likely to depend on the application and in particular the structure being monitored.

Preferably, the member is constructed and arranged so that it can be progressively flattened and wound about an axis extending transversely to the longitudinal extent of the member to form a coil so as to be reversibly configurable between a coiled form and an extended form, wherein the extended form is the structure-engaging form. The coiled form allows the sensor assembly to be conveniently stored when not deployed. This can make storing and transporting the sensor assembly to the site of the structure more convenient as well as making fitting the sensor assembly more convenient.

Preferably, both longitudinal opposed ends of the member are open ended so that the member can engage with and grip a said structure along the full length of the member.

In embodiments, the member is constructed and arranged to allow the sensor assembly to follow bending of the structure of interest whilst maintaining its grip on the structure and staying free from deformations, e.g. without buckling of the edges of the member. The precise amount of bending of the structure that the sensor assembly should be able to follow depends on the application of the sensor assembly and on the structure of interest and in particular on its diameter. Nonetheless, preferred embodiments of the sensor assembly are constructed and arranged such that the peak tensile and compressive strains of the member on the convex and concave sides of the bend respectively may be of a minimum of 4%.

In an embodiment, the member is formed from a bistable material having a first stable form in which it is coiled and generally flat in cross section, and a second stable form in which it is extended and has the structure-engaging form. Using a bistable material for the member means that the sensing assembly can be stable both when coiled and when extended and when partially coiled and partially extended. This allows safer and simpler storage of the sensing assembly without impacting its ability to engage with and grip the structure.

Preferably, the member is constructed and arranged to be reversibly clippable to a said structure of interest. This allows the sensor assembly to be removed from the structure for upgrading, or to be moved to a different position on the structure or to a different structure.

Preferably, the at least one sensor includes a fibre optic sensor that extends along at least a portion of the member.

Preferably, the member is formed from a laminate of at least two layers and said sensor is positioned between two of the layers. This protects the sensor from environmental damage.

Preferably, the sensor assembly comprises electronic apparatus in communication with the sensor arranged to provide at least one of: i) a data logging system to allow readings from the sensor to be logged system and ii) a data transmitting system to allow readings from the sensor to be transmitted to remote receiving apparatus.

According to a second aspect of the present invention there is provided in combination, deployment apparatus and a sensor assembly as described above, the deployment apparatus comprising:

a gripper for gripping a said structure of interest;
a holder for holding the sensor assembly when coiled;
actuating means for in use advancing the deployment apparatus relative to the structure; and, a guide member for progressively guiding the sensor assembly from being wound to being clipped to the structure as the deployment apparatus advances.

The combination may comprise a clamp dispenser arranged to automatically apply a clamp to the member to attach to attach the member to the structure at one or more points along the length of the member to keep the sensor assembly in position longitudinally on the structure.

According to a third aspect of the present invention there is provided a method of sensing a property associated with a structure of interest using a sensor assembly, the method comprising:

engaging an elongate member of the sensor assembly with the structure of interest, the elongate member being resiliently biased such that the member engages with and grips the structure along at least part of the length of the member; and, sensing a property associated with the structure with at least one sensor supported by the elongate member.

Preferably, engaging the member with the structure comprises progressively engaging the member with the structure along the length of the member.

In an embodiment, the member is formed from a sheet-like material having first and second longitudinal edges and when engaged with the structure the member forms a tube or a longitudinal section of a tube, wherein engaging the member with the structure comprises: separating the longitudinal edges of the member; moving the sensor assembly into position next to the structure; and, allowing the resiliency of the member to cause the member to engage with and grip the outside surface of the structure.

In another embodiment, engaging the member with the structure comprises: compressing the member; introducing the compressed member into a hollow portion of the structure; and, allowing the resiliency of the member to cause the member to engage with and grip the inside surface of the structure.

In an embodiment, the method comprises securing the sensor assembly to the structure at one or more points along the length of the member to keep the sensor assembly in position longitudinally on the structure. This helps avoid slippage of the sensor assembly along the structure.

Preferably, the step of sensing with the sensor comprises at least one of: a) sensing temperature; b) sensing pressure; c) sensing vibration; d) sensing stress; and e) sensing strain of the structure.

Embodiments of the present invention will now be described by way of example with reference to the accompanying drawings, in which:

FIG. 9 shows an example of deployment apparatus according to an embodiment of the present invention and FIGS. 9A and 9B show detail views of elements of FIG. 9.

Figure 1:
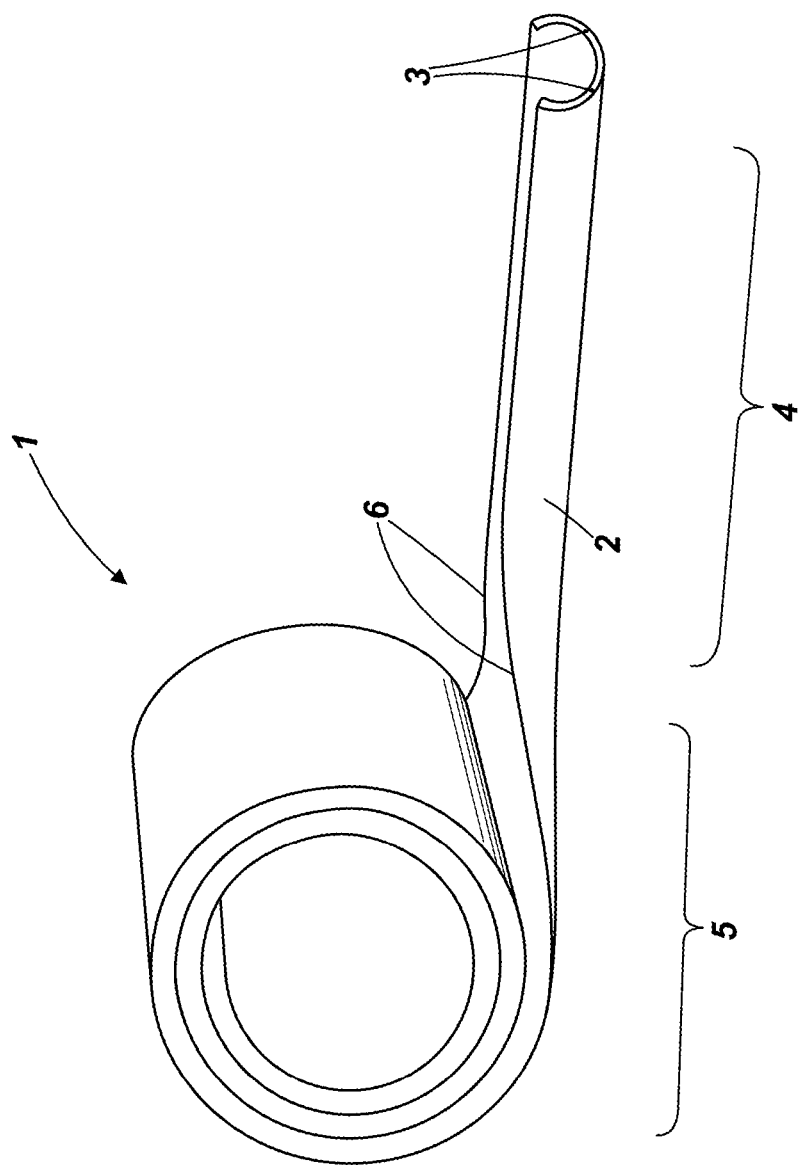
FIG. 1 shows an example of a sensor assembly according to an embodiment of the present invention.

Referring to FIG. 1, an example is shown of a sensor assembly 1 according to an embodiment of the present invention. The apparatus 1 comprises an elongate member 2. The member is formed of a strip of sheet-like material, i.e. the member is thin in cross section. The thinness of the material will in practice depend on the application of the sensor assembly 1. Nonetheless, in preferred embodiments the member may be less than 5 mm, or less than 2 mm, or less than 1 mm thin in cross section. It is anticipated that in most cases the thinness of the member compared to the width of the member with deployed may be less than 40. In some examples (not shown) additional layers may attached to the member 2 for various other purposes, such as floatation layers or layer providing protection from impact damage. These addition layers may give rise to higher overall thickness in the sensor assembly 1.

A plurality of sensors 3 are provided running along the length of the elongate member 2. In the present example, the sensors 3 are fibre optic sensors as described in more detail in the following description.

The member 2 as depicted has an extended portion 4 and a coiled portion 5. The member 2 is capable of being progressively transformed between being completely coiled and being completely extended. The length of the member 2 (i.e. its longitudinal extent) when fully extended is substantially greater than its width (i.e. its transverse extent) when extended. The preferred length will in practice depend on the application chosen for the sensor assembly 1. Nonetheless, in preferred embodiments the length of the member 2 may at least 5 times, or at least 10 times, or at least 50 times, or at least 100 times the width of the member 2.

Figure 2:
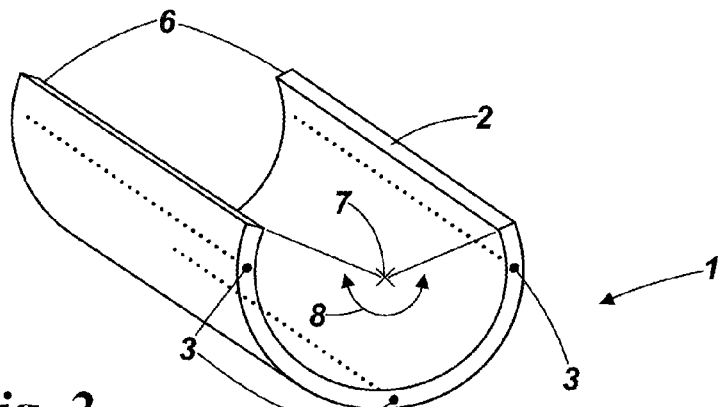
FIG. 2 shows a partial cut away of the example of FIG. 1.
Figure 3:
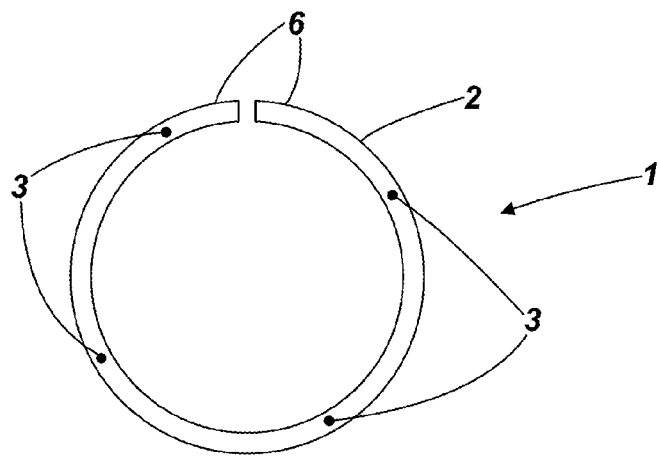
FIGS. 3 to 6 show in cross section further examples of sensor assemblies according to embodiments of the present invention.

As shown in more detail in FIG. 2, the extended portion 4 is resiliently biased to have a cross section that is curved in the form of a partial circle. The partial circle subtends an angle of about 200 degrees. In other words, from the centre of the circle 7, the member 2 sweeps out a partial circle over an angle 8 of about 200 degrees. It is preferred that the subtended angle is greater than 180 degrees so that the opening to the split tube is narrower than the maximum internal diameter of the tube. This enables the member to "clip" to a structure.

Figure 4:
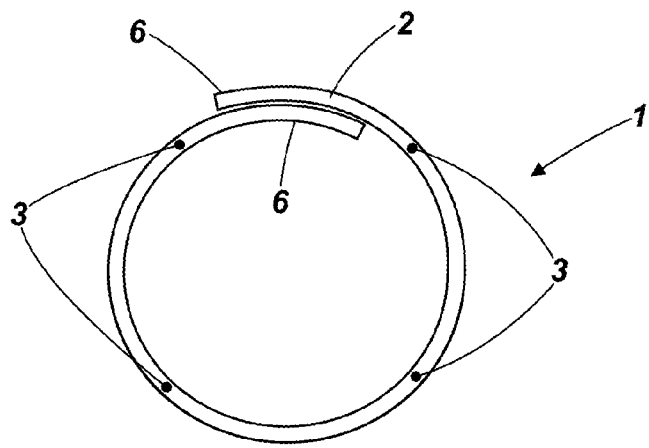

FIGS. 3 to 6 show other examples of cross sections for the member 2. In FIG. 2, the member 2 has a circular cross section subtending an angle of about 360 degrees, i.e. the member forms a circular tube with a longitudinal split where the edges 6 of the member meet. FIG. 4 shows a member 2 where the angle subtended is greater than 360 degrees, i.e. the member approximately forms a circular tube with some degree of overlap of the edges 6.

Figure 5:
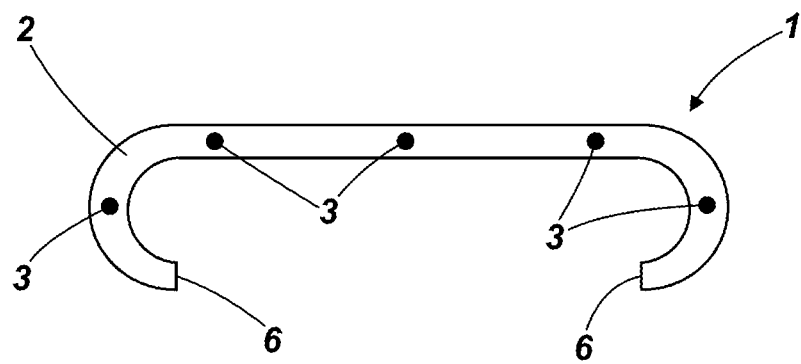
Figure 6:
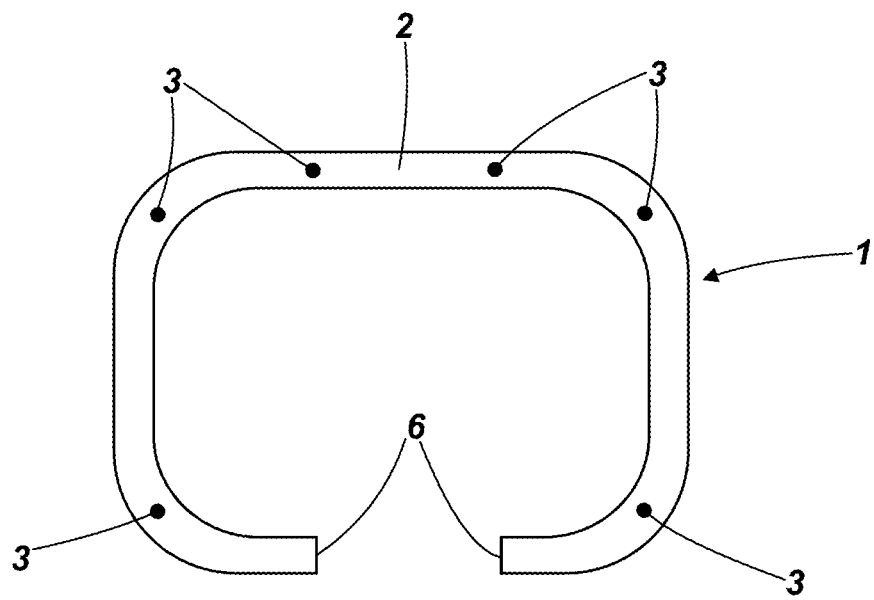

As shown by FIGS. 5 and 6, it is not essential to have a circular cross section. The cross section is however preferably generally curved. However, this does not preclude the cross section having straight portions whilst being generally curved. Ovals and other continuous, non-circular arcs subtending over 180 deg in total can also be produced.

Figure 7:
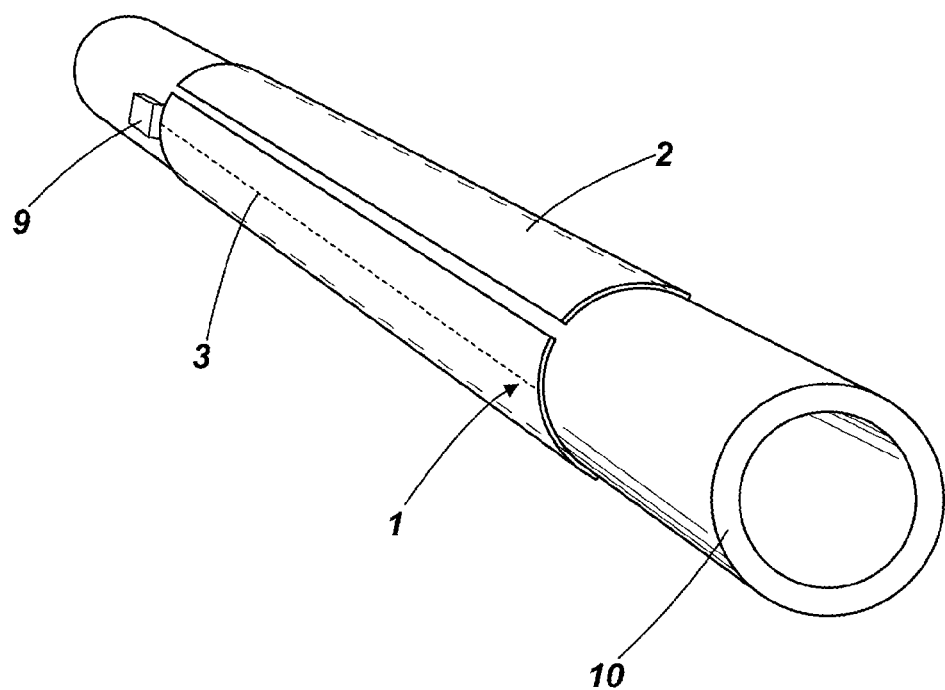
FIG. 7 shows an example of a sensor assembly according to an embodiment of the present invention when engaged with a structure.

FIG. 7 shows a sensor assembly 1 according to an embodiment of the present invention when engaged with a structure 10. The structure 10 in this example is a pipe having an approximately circular cross section. The sensor assembly 1 shown in FIG. 7 corresponds most closely to the sensor assembly 1 shown in FIG. 3, i.e. where the cross section of the member 2 is circular and subtends an angle of about 360 degrees. As will be appreciated, it is preferred that the sensor assembly 1 chosen for a particular application has a member cross section that matches the relevant surface of the structure to which it is being engaged to promote a good engagement and grip between the two. Thus, in the present case, a member having a circular cross section is most preferred for a pipe 10 having a circular cross section.

The extended member 2 is resiliently biased to maintain its circular cross section. This allows the member 2 to engage with and grip the outside surface of the structure 10. Because of the similarity of cross sectional shape of the member 2 and the shape of the structure 10, the sensor assembly 1 closely follows the structure 10. This enables the sensors 3 of the sensor assembly 1 to sense the properties of the structure 10. For example, temperature, pressure and vibration of the pipe 10 will be coupled to the sensor assembly 1, allowing the sensor 3 to sense these properties associated with the pipe 10 and allowing, with suitable calibration, a measurement to be taken from the sensor data. In this particular example, the member 2 has hoop stiffness large enough to grip the structure 10 and at the same time a longitudinal tensile/compressive modulus low enough to allow the sensor assembly 1 to follow bending of the structure of interest. This allows the sensor assembly 1 to grip and closely follow the structure as the structure bends or otherwise deforms allowing stress and strain to be transmitted to the sensor assembly 1 and so measured.

The preferred sensor 3 is a fibre optic cable sensor. Use of fibre optic cable sensors are known per se, for example for monitoring flexible pipes, as discussed in more detail in the following description in relation to FIG. 8. Nonetheless, other types of sensor can be used, for example a strain gauge. An electronics system 9 is provided and attached to an end of the sensor assembly 1. The electronics system may include a data-logger, power supply and associated instrumentation 9 connected to the sensors 3. The data-logger logs the outputs of the sensors 3. Alternatively or additionally, the system 9 can comprise a transmitter for relaying the sensor data to a remote receiver for analysis.

For the member 2, any material of sufficient resilience to be reversibly coiled and extended, and to maintain a closure force sufficient to provide good coupling between sensor assembly 1 and the underlying structure 10 could, in principle, be used. For example, suitable elastomeric polymers and even, in cases where the in-use strain is low, spring metals, could be used for the member 2. In practice, metals are not preferred as they would have moduli significantly higher than that of the polymers.

The use of a laminar construction with the sensors 3 embedded between layers of the lamina gives an advantageous combination of strain transfer, protection of the fibre from impact, abrasion etc. The layers of the laminar could be polymer, elastomer or even metallic and bonding of the sensor be achieved by adhesively laminating or by "processing in" in the case of a laminar structure that is a fibre reinforced composite (FRC).

In principle, there are many different methods that are suitable to construct the sensor assembly 1. A particularly preferred method is to laminate the sensors 3 between layers of fibre reinforced polymer ("FRP" hereafter). FRPs are known per se and are not described in detail herein. However, in brief, FRPs are composite materials made of a polymer matrix reinforced with fibres. The fibres are usually fiberglass, carbon, or aramid, while the polymer is usually an epoxy, vinylester or polyester thermosetting plastic. The use of fibrous materials mechanically enhances the strength and elasticity of the plastics. The original plastic material without fibre reinforcement is known as the matrix. The matrix is a tough but relatively weak plastic that is reinforced by stronger stiffer reinforcing filaments or fibres. The extent that strength and elasticity are enhanced in a fibre reinforced plastic depends on the mechanical properties of both the fibre and the matrix, their volume relative to one another, and the fibre length and orientation within the matrix.

The sensors 3 can be laminated either by incorporating them at the time of consolidation, or by post bonding two or more layers of FRP shell using an adhesive to hold the shells together with the sensors 3 in between the layers of the laminar. The use of FRP allows the mechanical characteristics of the shell to be manipulated by varying the weight and direction of fibres in the various layers in such a manner as to produce something that can be tailored to the needs of a specific application of the sensor assembly 1.

Thus, a FRP is a particularly preferred material for making the member 2 as it allows fine tuning of axial/torsional/hoop stiffness to be achieved by, for example, changing the angles and fibre content of the layers. Nonetheless, other materials are possible. For example, a metal ribbon can be used and tuning of its properties can be achieved by punching holes and slots into the metal ribbon.

In a preferred embodiment, the material used for the member is a bistable material, whether made of FRP or otherwise. Such a bistable member comprises an extendable, coilable member that can be reconfigured from a coiled or retracted state to an extended state. The sensor assembly 1 shown in FIG. 1 can be made optionally from a bistable material such that it has a first stable state in the coiled form, wherein the cross section of the member is generally flat and a second stable state in the extended form, wherein the cross section of the member is curved as previously described. Preferably, the bistable member 2 is capable of reversible configuration between its coiled and extended forms a plurality of times. Suitable structures are disclosed in the following international patent applications, each of which is incorporated here by reference: WO-A-88/08620, WO-A-97/35706, WO-A-99/62811, and WO-A-99/62812. Such bistable structures are available from RolaTube Technology Limited of Lymington, United Kingdom.

As described in the above-referenced patent applications, such a bistable member generally comprises material that creates a bias towards configuring the material in the extended form (e.g. having a circular cross-section in this example), as well as material that creates a bias opposite to the first bias (e.g. one that biases the member towards its flattened, retracted or coiled form). The member can comprise a resilient substrate, made of metal for example, which is biased toward the extended form (e.g. biased toward making the member have a circular cross-section), laminated with a plastic layer that tends to bias the member towards the retracted form (e.g. having a flattened cross-section). Alternatively, the member can comprise a strip or sheet of a thermoplastic material having prestressing means attached thereto or embedded therein. One particular example is a thermoplastic strip having prestressed fibres therein (such as fibres of glass, carbon, or polymeric materials). The fibres can be located at different angles relative to each other in the plane of the coiled member, such as comprising one set of fibres that are longitudinally extending and a second set of fibres that are transversely extending. Such fibres-reinforced composite members (e.g. a thermoplastic resin, such as polyethylene or polypropylene, with fibres of another material, such as glass, carbon, or aramid, embedded therein) are preferred for use in the present invention.

Whatever material is used to form the member 2, and whatever cross section is used for the member 2, what is important is that the member 2 is capable of engaging with and gripping the structure 10. Potentially many types of material, construction and cross section are usable, dependent upon the application, i.e. structure being monitored and what properties are being monitored.

As a general rule, it is preferred that the axial modulus of the member 2 (and thus the bending stiffness of the sensor assembly 1 when deployed) should be as low as is consistent with providing a member 2 that has sufficient strength, impact resistance, abrasion resistance, etc. to survive the environment in which it is to be used, and in any event very significantly lower than that of the underlying structure 10.

As another general rule, it is preferred that the hoop modulus, with reference to the hoop bending "plane" (i.e. the force exerted to clamp the device onto the underlying structure) should be high enough to ensure that the device cannot move relative to the underlying structure 10 and to prevent buckling out the "seam" line formed by the edges 6 of the member 2 under bending where this is the concave bending face.

In the case of acoustic monitoring of the structure 10, the requirements may be different again. Flexing of the structure 10 may be minimal, so it is not essential to have low bending stiffness of the extended member 2. In any case, it is always desired to have sufficient hoop closure of the member 2 to couple it closely to the structure 10 and it needs to be resilient enough to be coiled.

Figure 8:
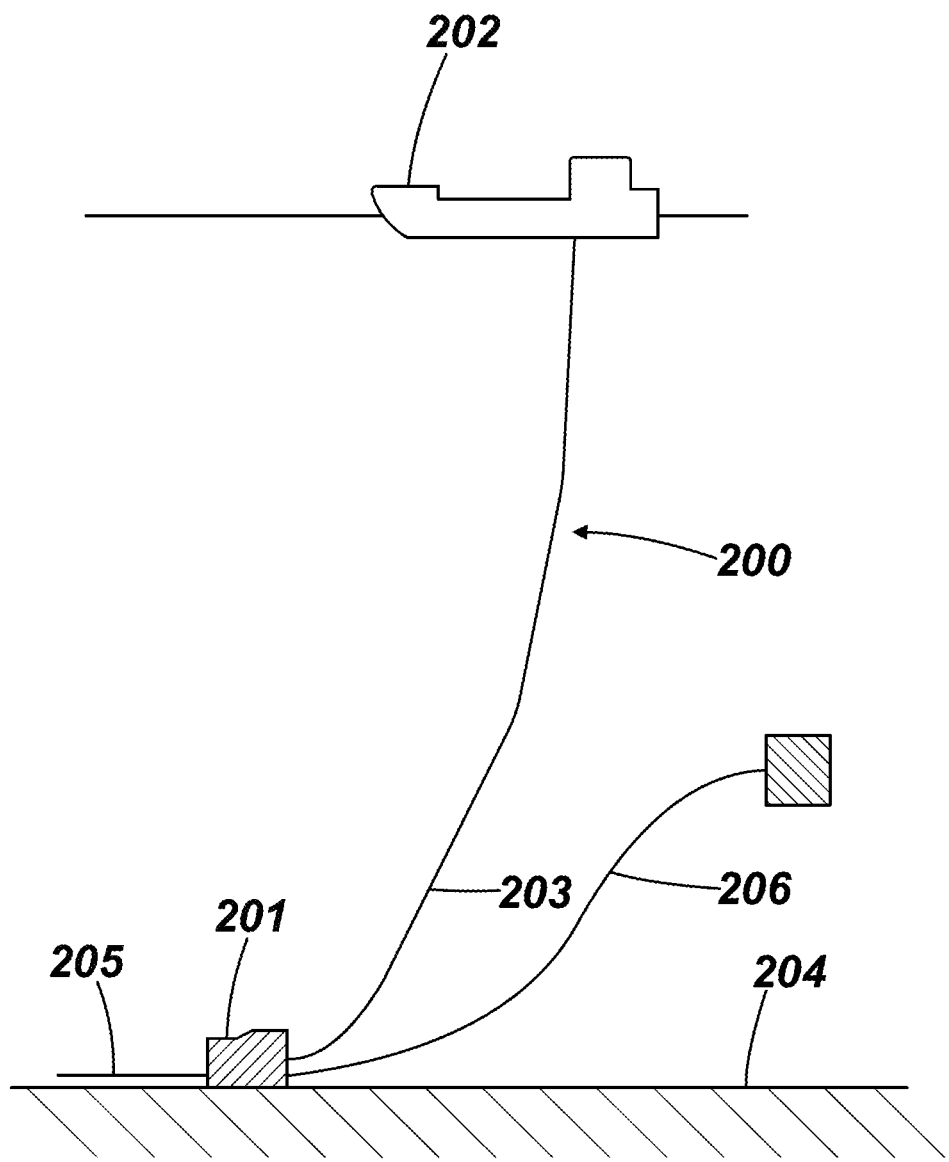
FIG. 8 shows an example of a structure for which the present invention has particular applicability.

FIG. 8 shows a preferred application of the present invention. It is known to use flexible pipe to transport production fluids, such as oil and/or gas and/or water, from one location to another. FIG. 8 shows a riser assembly 200 suitable for transporting production fluid such as oil and/or gas and/or water from a sub-sea location 201 to a floating facility 202. The flexible flow line 205 comprises a flexible pipe, wholly or in part, resting on the sea floor 204 or buried below the sea floor and used in a static application. The floating facility may be provided by a platform and/or buoy or, as in this example, a ship 202. The riser 200 is provided as a flexible riser, that is to say a flexible pipe connecting the ship to the sea floor installation. Portions of flexible pipe body can be utilised as a flowline 205 or jumper 206. The pipe body is generally built up as a structure including metallic and polymer layers. The pipe structure allows large deflections without causing bending stresses and strains that impair the functionality of the pipe over its lifetime. Flexible pipe is particularly useful in connecting a sub-sea location to a sea level location.

It is desirable to be able to detect the mechanical impacts on the flexible pipe 200 along its length, which may comprise great and unpredictable forces or very varying temperature impacts. It is particularly desirable to monitor flexible pipes 200 as they have a complex construction and the consequences of failure are potentially catastrophic, for example lethal danger to crew and platform workers as well as presenting an extreme environmental hazard. Also lost production due to failure of a pipe can be very costly and such pipes are typically very difficult and expensive to replace. It is therefore highly desirable to monitor the pipe 200 and detect pipe degradation before failure or danger to personnel. In addition, existing calculations for pipe life spans are very conservative with high safety factors. By effectively monitoring the pipe 200, the pipes can be utilised with greater efficiency.

To this end, it is known in the art to monitor flexible pipes 200 with built-in fibre-optical sensors or other sensors such as strain gauges in selected layers of the flexible pipe. For example, US-A-2005/0210961 discloses equipping a flexible pipe with linear extensometers or gauges designed to detect twists in the pipe. US-A-2004/0168521 discloses providing a groove in one of the layers of a flexible pipe into which a fibre optic sensor is secured during manufacture of the flexible pipe, such that the fibre optic sensor is sandwiched within the body of the flexible pipe.

In this way various properties associated with the flexible pipes 200 can be monitored, including strain (e.g. for possible metal fatigue), temperature (e.g. for possible overheating or detection of breaches), pressure (e.g. for detecting excess build up) and the ingress of gas into the internal layers of the flexible pipe (e.g. which can lead to corrosion). Sensing using fibre optic in this way is generally known in the art and is therefore not described in detail herein.

The disadvantage of such arrangements is that the sensors must be incorporated into the pipes during manufacture. Pipes 200 manufactured without sensors cannot of course be monitored in this way. Also, once fitted, the sensors cannot be removed from the pipes, for example for upgrading or repair, nor moved to a different position on the pipe or to another pipe.

For these reasons, the sensor assembly 1 according to an embodiment of the present invention is particularly preferred for use with a flexible sub-sea pipe 200 of this sort. As described above, the sensor assembly 1 can be clipped to a pipe and used to monitor the performance of the pipe 200.

As will be appreciated, it is preferred to use automation where it is desired to retrofit a sensor assembly 1 to a flexible pipe 200 that is already in position, i.e. sub-sea. FIG. 9 shows an example of an automated apparatus 100, i.e. a remotely operated vehicle (ROV), for deploying the sensor assembly on a sub-sea flexible pipe 200.

The sensor assembly 1 is initially provided to the deployment apparatus 100 in its coiled form. The electronics system 9 is pre-installed on the end of the coiled sensor assembly 1, for example in the space within the centre of the coil. Making the connections between the sensors 3 and the instrumentation before deployment avoids the need for connections to be made sub-sea. The size of this space in the centre of the coil can be varied in order to provide a suitable envelope for this equipment.

The deployment apparatus 100 is fitted with a dispenser 101 for holding the coiled sensor assembly 1 and guiding the sensor assembly 1 into position on the flexible pipe 200. The deployment apparatus 100 has a motor 102 and power source (not shown), such as a battery, for powering the deployment of the sensor assembly 1. The deployment apparatus 100 has a calliper 103 at one end comprising two actuated, pivoted arms 103a, 103b which are actuated to fit over the flexible pipe 200 and extended sensor assembly 1, as shown in FIG. 9A. The calliper 103 retains the deployment apparatus 100 in position with respect to the flexible pipe 200 during the installation procedure and helps ensure that the sensor assembly 1 is accurately positioned relative to the flexible pipe 200 as it is deployed. The calliper 103 also ensures a tight, accurate fit between the sensor assembly 1 and the pipe 200. Optionally, a secondary guide (not shown) may be provided at the opposite end of the deployment apparatus 100, in order to maintain alignment and avoid stressing the dispenser mountings.

The coiled sensor assembly 1 is fitted behind the guide calliper 103 and has a narrow, protruding tongue 11 at its free end that is left extended through the calliper 103. This allows the end of the sensor assembly 1 to be secured to the pipe 200 prior to deployment. Preferably, a band clamp 12 is used for securing the tongue 11, as shown in FIG. 9B. The deployment apparatus 100 has a band clamp deployment system 104 for applying the band clamp 12 such that the tongue 11 is secured to the flexible pipe 200. The band clamp deployment system 104 can be incorporated into the dispenser 101, as shown, or alternatively can be separately deployed. Although the resiliency of the member 2 is sufficient to grip the structure in most situations, optionally, the sensor assembly 1 can also be clamped to the flexible pipe 200 at more than one location along its length to help keep the sensor assembly 1 in place on the structure. It is preferred to have at least a clamp 12 at the start of the run to keep the first end of the sensor assembly 1 in place, especially during deployment, and a clamp 12 at the opposite end of the sensor assembly 1 to ensure absence of slippage along the length of the deployed sensor assembly 1. Intermediate clamps 12 may, or may not, be desired depending on such factors as the length of run and the diameter of the pipe 200. Data defining the need for and spacing of clamps can be obtained by carrying out preliminary testing.

The deployment process is as follows:—
1) The deployment apparatus 100 locks the guide calliper 103 over the pipe 200.
2) A band clamp 12 is deployed to lock the tongue 11 and the end of the sensor assembly 1 onto the pipe 200.
3) The motor moves the deployment apparatus 100 moves along the pipe 200, deploying the sensor assembly 1 along its length.

The motor 102 may move the deployment apparatus 100 along the flexible pipe 200 and in so doing pull the sensor assembly 1 out of the dispenser 101 as the deployment apparatus 100 advances. Alternatively, the motor 102 may power the dispenser 101 itself, so that the sensor assembly 1 is progressively unwound under the power of the motor 102, and using this to push the deployment apparatus 100.
4) As the sensor assembly 1 is progressively unwound and clipped along its length to the pipe 200, band clamps 12 are applied, as required, along the length of the sensor assembly 1.
5) The end of the sensor assembly 1 clears the dispenser 101 and is optionally clamped in place, with the electronics system 9 attached as shown for example in FIG. 7.
6) The calliper 103 is disengaged and the deployment apparatus 100 can be recovered.

Suitable mechanisms for dispensing the sensor assembly 1 under power, as noted in 3 above, are known per se in the prior art. Such mechanisms are manufactured for example by RolaTube Technology Limited of Lymington, United Kingdom for the powered deployment of bistable coiled members. These currently find application in such areas as the monitoring of nuclear power stations, and the deployment of military hardware. Such mechanisms can be simple and rugged and no problems would be anticipated in producing a mechanism suitable for this purpose. The final decision on whether to power the dispenser 101 or to rely on the drive of the deployment apparatus 100 for deployment can be made depending on what is desirable for the particular implementation on a case by case basis.

Depending on the length of sensor assembly 1 to be deployed and the size of the pipe 200 to be monitored it may prove desirable to have a dispenser 101 large enough to hold more than one sensor assembly 1 monitoring element. Multiple installations could thus be made on single dives.

Embodiments of the present invention have been described with particular reference to the examples illustrated. However, it will be appreciated that variations and modifications may be made to the examples described within the scope of the present invention.

The invention claimed is:

1. A sensor assembly for sensing a property associated with a structure of interest, the assembly comprising:
   an elongate member constructed and arranged to have a structure-engaging form, wherein, in the structure-engaging form, the elongate member is resiliently biased such that the elongate member engages with and grips said structure along at least part of the length of the elongate member, wherein a longitudinal extent of the elongate member is at least 5 times a transverse extent of the elongate member when in the structure-engaging form; and,
   at least one fibre optic sensor fixed to the elongate member and extending longitudinally along the elongate member, wherein the sensor assembly grips and follows a length of the structure as the structure bends or deforms and so allows the fibre optic sensor to sense a property associated with that length of the structure.

2. A sensor assembly according to claim 1, wherein the elongate member is formed from a sheet-like material having first and second longitudinal edges that is folded in on itself longitudinally to form a tube or a longitudinal section of a tube when the elongate member is in the structure-engaging form.

3. A sensor assembly according to claim 1, wherein in transverse cross section the structure-engaging form of the elongate member subtends an angle of at least 180 degrees.

4. A sensor assembly according to claim 1, wherein in transverse cross section the structure-engaging form of the elongate member subtends an angle of about 360 degrees.

5. A sensor assembly according to claim 1, wherein in transverse cross section the structure-engaging form of the elongate member subtends an angle of more than 360 degrees.

6. A sensor assembly according to claim 1, wherein in transverse cross section the structure-engaging form of the elongate member is generally curved.

7. A sensor assembly according to claim 1, wherein the elongate member is constructed and arranged so that the elongate member is progressively flattenable and windable about an axis extending transversely to the longitudinal extent of the elongate member to form a coil so as to be reversibly configurable between a coiled form and an extended form, wherein the extended form is the structure-engaging form.

8. A sensor assembly according to claim 1, wherein both longitudinal opposed ends of the elongate member are open ended so that the elongate member is configured to engage with and grip said structure along the full length of the elongate member.

9. A sensor assembly according to claim 1, wherein the elongate member is formed from a bistable material having a first stable form, wherein in the first stable form the elongate member is coiled and generally flat in cross section, and a second stable form, wherein in the second stable form the elongate member is extended and has the structure-engaging form.

10. A sensor assembly according to claim 1, wherein the elongate member is constructed and arranged to be reversibly attachable to said structure.

11. A sensor assembly according to claim 1, wherein the elongate member is formed from a laminate of at least two layers and said sensor is positioned between two of the layers.

12. A sensor assembly according to claim 1, comprising electronic apparatus in communication with the sensor arranged to provide at least one of: i) a data logging system to allow readings from the sensor to be logged system and ii) a data transmitting system to allow readings from the sensor to be transmitted to remote receiving apparatus.

13. A method of sensing a property associated with a structure of interest using a sensor assembly, the method comprising:

engaging an elongate member of the sensor assembly with the structure of interest, the elongate member being resiliently biased such that the elongate member engages with and grips the structure along at least part of a length of the elongate member, wherein a longitudinal extent of the elongate member is at least 5 times a transverse extent of the elongate member when in the structure-engaging form; and, sensing a property associated with the structure with at least one fibre optic sensor fixed to the elongate member and extending longitudinally along the elongate member, wherein the sensor assembly grips and follows a length of the structure as the structure bends or deforms and so allows the fibre optic sensor to sense a property associated with that length of the structure.

14. A method according to claim 13, wherein engaging the elongate member with the structure comprises progressively engaging the elongate member with the structure along the length of the elongate member.

15. A method according to claim 13, wherein the elongate member is constructed and arranged so that the elongate member is progressively flattenable and windable about an axis extending transversely to a longitudinal extent of the elongate member to form a coil so as to be reversibly configurable between a coiled form and an extended form, the method comprising:

progressively unwinding the sensor assembly from the coiled form and engaging the extended portion with the structure.

16. A method according to claim 15, wherein the elongate member is formed from a bistable material having a first stable form when the elongate member is in the coiled form and a second stable form when the elongate member is in the extended form.

17. A method according to claim 13, wherein the elongate member is formed from a sheet-like material having first and second longitudinal edges and when engaged with the structure the elongate member forms a tube or a longitudinal section of a tube, wherein engaging the elongate member with the structure comprises:

separating the longitudinal edges of the elongate member;

moving the sensor assembly into position next to the structure; and, allowing the resiliency of the elongate member to cause the elongate member to engage with and grip the outside surface of the structure.

18. A method according to claim 13, comprising securing the sensor assembly to the structure at one or more points along the length of the elongate member to keep the sensor assembly in position longitudinally on the structure.

19. A method according to claim 13, comprising removing the sensor assembly from the structure.

20. A method according to claim 13, where the step of sensing with the sensor comprises at least one of:
a) sensing temperature;
b) sensing pressure;
c) sensing vibration;
d) sensing stress; and
e) sensing strain of the structure.

* * * * *